United States Patent
Wang et al.

(10) Patent No.: US 12,484,596 B2
(45) Date of Patent: Dec. 2, 2025

(54) **KOMBUCHA FERMENTED BEVERAGE PRESERVING ACTIVE *BACILLUS COAGULANS* AT AMBIENT TEMPERATURE AND PREPARATION METHOD THEREOF**

(71) Applicants: A.G.V. PRODUCTS CORP., Chiayi (TW); KULUDRINK KOMBUCHA LTD., Taipei (TW)

(72) Inventors: Yu-Fen Wang, Chiayi (TW); Kwan-Han Chen, Chiayi (TW); Hung-Chi Hsiao, Chiayi (TW); Meng-Hsuan Chuang, Chiayi (TW); Yen-Chung Chen, Chiayi (TW); Yu-Shin Chen, Chiayi (TW); Pi-Feng Tsao, Chiayi (TW); Chun-En Gao, Chiayi (TW)

(73) Assignees: A.G.V. PRODUCTS CORP, Chiayi County (TW); KULUDRINK KOMBUCHA LTD., Taipei (TW)

( * ) Notice: Subject to any disclaimer, the term of this patent is extended or adjusted under 35 U.S.C. 154(b) by 367 days.

(21) Appl. No.: 17/948,186

(22) Filed: Sep. 19, 2022

(65) Prior Publication Data
US 2023/0125582 A1    Apr. 27, 2023

(30) Foreign Application Priority Data
Oct. 21, 2021   (TW) .................................. 110139078

(51) Int. Cl.
*A23F 3/10*    (2006.01)
*A23L 2/38*    (2021.01)
(52) U.S. Cl.
CPC ................ *A23F 3/10* (2013.01); *A23L 2/382* (2013.01); *A23V 2400/169* (2023.08)
(58) Field of Classification Search
CPC ....................................................... A23F 3/10
See application file for complete search history.

(56) References Cited

FOREIGN PATENT DOCUMENTS

CN        111480721 A  *  8/2020  ............... A23F 3/34

OTHER PUBLICATIONS

Translation of Peng_CN111480721A (Year: 2020).*
Antolak et al., Kombucha Tea—A Double Power of Bioactive Compounds from Tea and Symbiotic Culture of Bacteria and Yeasts (SCOBY), Sep. 2021, Antioxidants, 10, 1541 (Year: 2021).*
"Is Reverse Osmosis Water Safe?", Sep. 2021, Rayne Water, https://web.archive.org/web/20210928173626/https://www.raynewater.com/blog/is-reverse-osmosis-water-safe (Year: 2021).*
Kim et al., 1995, "Measurement of Superoxide Dismutase-like Activity of Natural Antioxidants", Biosci. Biotech. Biochem., 59(5), pp. 822-826 (Year: 1995).*
Wang et al., "Microbiological and Physico-Chemical Characteristics of Black Tea Kombucha Fermented with a New Zealand Starter Culture", 2023, foods, 12, 2314 (Year: 2023).*
"KuluDrink", Aug. 2020, YouTube , https://www.youtube.com/watch?v=SfjL167B35I) (Year: 2020).*

* cited by examiner

*Primary Examiner* — Nikki H. Dees
*Assistant Examiner* — Kelly P Kershaw
(74) *Attorney, Agent, or Firm* — Chih Feng Yeh; Yongjean Consulting Inc.

(57) ABSTRACT

The subject invention relates to two-stage inoculation and two-stage fermentation process which are performed by the inoculation time difference and staged fermentation. In the first stage, *Bacillus coagulans*, lactic acid bacteria and *Acetobacter aceti* are inoculated into a fermentation tank to perform primary fermentation to produce primary fermented material. In the second stage, yeast is added into the primary fermented material in a container to perform the secondary fermentation to produce secondary fermented material, and then the secondary fermented material is pasteurized to deactivate yeast, lactic acid bacteria and *Acetobacter aceti* in the container and stop fermentation reaction. Finally, the secondary fermented material is cooled to ambient temperature to prepare the kombucha fermented beverage preserving active *Bacillus coagulans* at ambient temperature. The invention is help to improve the preservation convenience of the kombucha fermented beverage and avoid excessive alcohol concentration.

10 Claims, 4 Drawing Sheets

KOMBUCHA FERMENTED BEVERAGE PRESERVING ACTIVE *BACILLUS COAGULANS* AT AMBIENT TEMPERATURE AND PREPARATION METHOD THEREOF

CROSS-REFERENCE STATEMENT

The present application is based on, and claims priority from, Taiwan Patent Application Serial Number 110139078, filed Oct. 21, 2021, the disclosure of which is hereby incorporated by reference herein in its entirety.

BACKGROUND

1. Technical Field

The present invention relates to a kombucha fermented beverage and a preparation method, and more particularly to a kombucha fermented beverage preserving active *Bacillus coagulans* at ambient temperature and a preparation method thereof.

2. Related Art

In recent years, with the rise of health awareness, various health drinks have sprung up, such as fermented beverage with active bacteria and enzyme. However, the fermented beverage on the market needs to be refrigerated, and the fermented beverage that can be stored at ambient temperature has dead bacteria only. Therefore, how to maintain active *Bacillus coagulans* at ambient temperature has become one of the problems that manufacturers are eager to solve.

In general, conventional fermented beverage, such as kombucha made by fermenting tea, sugar and SCOBY of yeast, contains yeast, *Acetobacter aceti* and tea polyphenols. The kombucha fermented beverage has a sweet and sour taste with bubbles in drinking. In addition, the raw material includes tea, so the kombucha fermented beverage also has antioxidant components; the fermentation is performed by using sugar and SCOBY of yeast, so the kombucha fermented beverage has carbon dioxide and acetic acid that are helpful for intestinal health care and promotion of gastric acid secretion. Therefore, when the kombucha fermented beverage is drunk with regular meals, it has the effect of helping digestion and is quite positive for physical health. However, due to the complex ecology of the bacteria in SCOBY, it is difficult to completely confirm the source and identity of the bacteria contained in the SCOBY, so it may cause risks in terms of hygiene and safety, and it is hard to maintain the consistency of the taste. On the other hand, in order to maintain active *Bacillus coagulans*, it is necessary to keep the conventional kombucha fermented beverage in a refrigerated state, so preservation of the conventional kombucha fermented beverage is not easy. Furthermore, the carbon dioxide produced under the action of yeast is positively correlated with alcohol. An alcohol content of the conventional kombucha fermented beverage often exceeds the regulations of non-Alcoholic Beverage. The conventional kombucha fermented beverage has the problem of difficulty in storage at ambient temperature and the concentration of alcohol exceeding the standard.

According to above-mentioned contents, it is necessary to develop an improved technical solution to solve the problems of difficulty in storage of the kombucha fermented beverage at ambient temperature and the concentration of alcohol exceeding the standard.

SUMMARY

An objective of the present invention is to disclose a kombucha fermented beverage preserving active *Bacillus coagulans* at ambient temperature, and a preparation method.

In order to achieve the objective, the present invention provides a kombucha fermented beverage preserving active *Bacillus coagulans* at ambient temperature. The primary fermentation is performed on sugary extract, *Bacillus coagulans*, *Acetobacter aceti* and lactic acid bacteria to produce primary fermented material. The secondary fermentation is performed on the primary fermented material and yeast, and then heat treatment is performed on secondary fermented material so as to prepare the kombucha fermented beverage.

In order to achieve the objective, the present invention provides a preparation method of kombucha fermented beverage preserving active *Bacillus coagulans* at ambient temperature. And the preparation method includes the following steps:

(1) Preparing reverse osmosis water at 70~100° C., and adding tea leaves to the reverse osmosis water to produce a mixture;

(2) Continuously stirring the mixture at every time interval to produce extract an until the Brix of the extract is in a range of 0.2 to 0.7, the pH value of the extract is in a range of 3.4 to 6.8 and the color of the extract matches the preset tea color;

(3) Adding a sugary additive component to the extract, and continuously stirring the sugary additive component and the extract at a temperature of 70~100° C. to produce a sugary extract until the Brix of the sugary extract is in a range of 3.1 to 6.2 and the pH value of the sugary extract is in a range of 3.4 to 6.8;

(4) Placing the sugary extract in a fermentation tank and cooling the sugary extract down to 25~40° C., adding *Bacillus coagulans*, *Acetobacter aceti* and lactic acid bacteria into the fermentation tank to continuously perform primary fermentation on the sugary extract to produce a primary fermented material until the Brix of the primary fermented material is in a range of 2.7 to 5.5, the pH value of the primary fermented material is in a range of 2.7 to 4.6, and a total acidity of the primary fermented material is in a range of 0.03 g/100 g to 0.10 g/100 g;

(5) Filtering the primary fermented material and placing into a mixing tank; adding yeast into the mixing tank to mix with the primary fermented material, and filtering the mixed primary fermented material and filling the filtered primary fermented material into a container for secondary fermentation with the yeast to produce a secondary fermented material until the Brix of the secondary fermented material is in a range of 2.4 to 5.5, the pH value of the secondary fermented material is in a range of 2.5 to 4.6, the total acidity of the secondary fermented material is in a range of 0.06 g/100 g to 0.16 g/100 g, the alcohol content of the secondary fermented material is lower than 0.5%, and the volume of carbon dioxide of the secondary fermented material is equal to or greater than 2.0; and (6) After the secondary fermentation is completed, the secondary fermented material in the container is subjected to heat treatment to deactivate the yeast, the lactic acid bacteria, and the *Acetobacter aceti* in the container and stop fermentation reaction, and then cooling the secondary fermented material to ambient temperature to prepare fermented kombucha beverage preserving active *Bacillus coagulans* at ambient temperature.

According to the above-mentioned kombucha fermented beverage and the preparation method of the present invention, the difference between the present invention and the conventional technology is that the two-stage inoculation and two-stage fermentation process are performed by inoculation time difference and staged fermentation. In the first stage, *Bacillus coagulans*, *Acetobacter aceti* and lactic acid bacteria are inoculated into the fermentation tank to perform primary fermentation to produce the primary fermented material. In the second stage, yeast is added into the primary fermented material in the container to perform secondary fermentation and produce the secondary fermented material. Finally, the secondary fermented material is then pasteurized to deactivate the yeast, the lactic acid bacteria and the *Acetobacter aceti* in the container and stop fermentation reaction, and then the secondary fermented material is cooled to ambient temperature to prepare the kombucha fermented beverage preserving active *Bacillus coagulans* at ambient temperature.

Therefore, the above-mentioned technical solution of the present invention is able to achieve the technical effect of improving the storage convenience of the kombucha fermented beverage and preventing the concentration of alcohol from exceeding a standard.

BRIEF DESCRIPTION OF THE DRAWINGS

The structure, operating principle and effects of the present invention will be described in detail by way of various embodiments which are illustrated in the accompanying drawings.

DETAILED DESCRIPTION

Figure 1A:
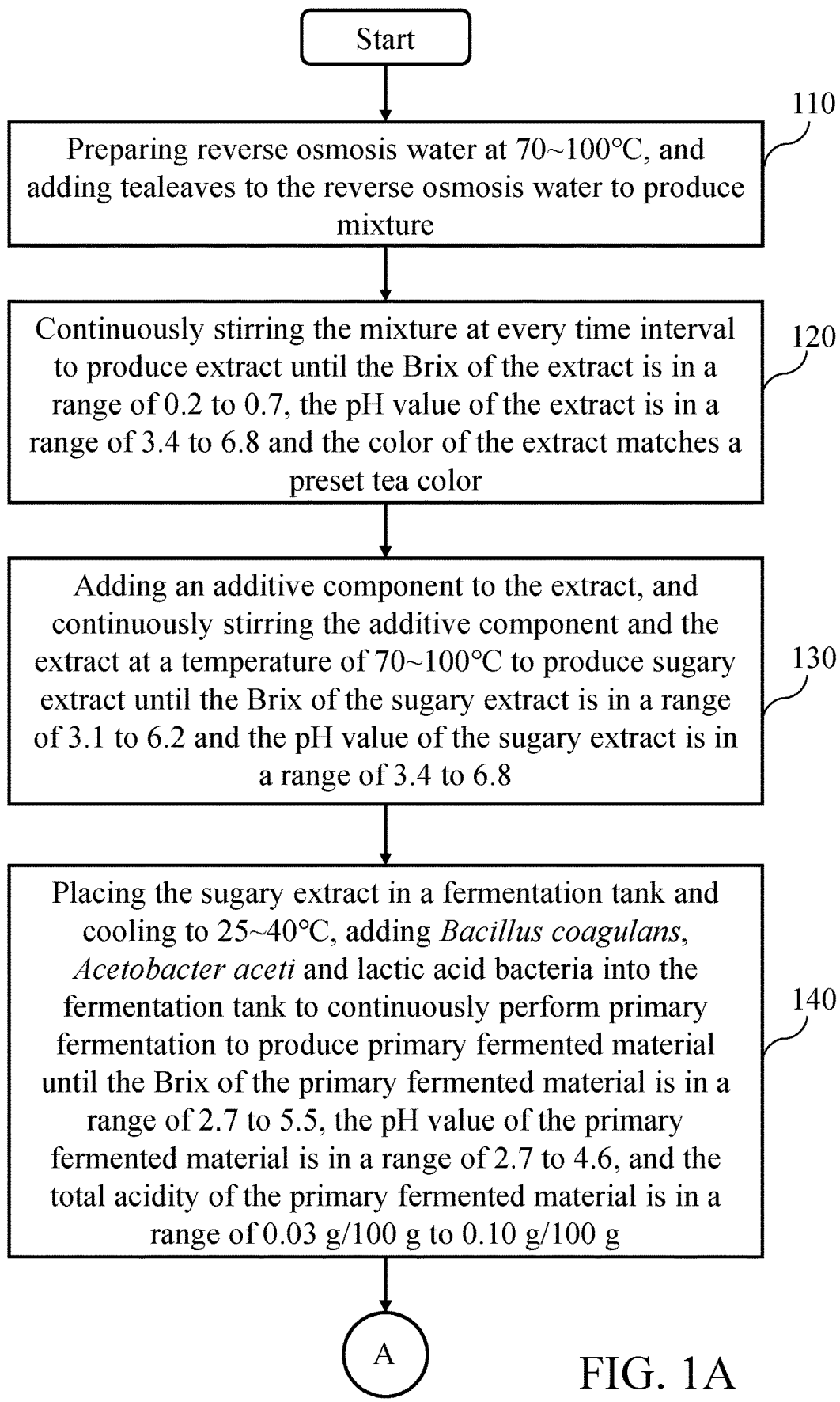
FIGS. 1A and 1B are flowcharts of a preparation method of kombucha fermented beverage preserving active *Bacillus coagulans* at ambient temperature, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, the first element discussed herein could be termed the second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The definition of the numerical range mentioned in the present invention is described before illustration of a preparation method of kombucha fermented beverage preserving active *Bacillus coagulans* at ambient temperature, according to the present invention. For example, unless otherwise specified, when a numerical range of "A" is from 10 to 15, it means that the numerical range of "A" includes an upper limit value and a lower limit value (that is, $10 \le A \le 15$) and all numerical values in the range (such as, 11, 12, 13 and 14). When the numerical range does not define the lower limit value (for example, "B" is below 0.2%, or "B" is lower than 0.2%), it means that the lower limit is close to the numerical value 0 but does not include the numerical value 0, that is, $0\% < B \le 0.2\%$.

Figure 1B:
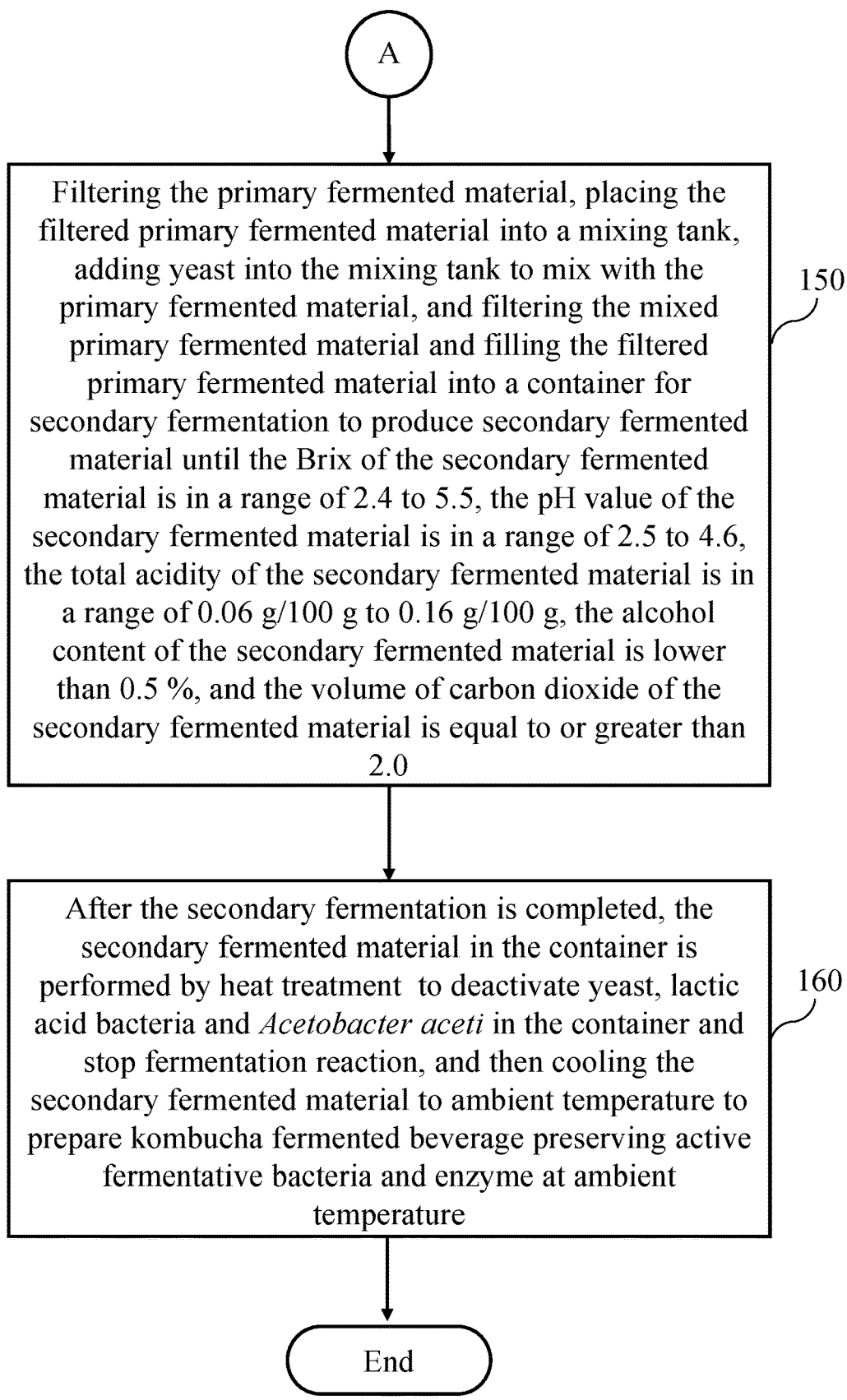

The preparation method of kombucha fermented beverage, preserving active *Bacillus coagulans* at ambient temperature, of the present invention will hereinafter be described in more detail in the following paragraphs with reference to the accompanying drawings. Please refer to FIGS. 1A and 1B, which are flowcharts of a preparation method of kombucha fermented beverage preserving active *Bacillus coagulans* at ambient temperature, according to the present invention. The preparation method includes steps 110 to 160. In a step 110, reverse osmosis water at 70~100° C. is prepared, and tea leaves are added to the reverse osmosis water to produce a mixture. In a step 120, the mixture is continuously stirred at every time interval to produce extract until the Brix of the extract is in a range of 0.2 to 0.7, the pH value of the extract is in a range of 3.4 to 6.8 and the color of the extract matches the preset tea color. In a step 130, an sugary additive component is added to the extract, and the sugary additive component and the extract are continuously stirred at a temperature of 70~100° C. to produce sugary extract until the Brix of the sugary extract is in a range of 3.1 to 6.2 and the pH value of the sugary extract is in a range of 3.4 to 6.8. In a step 140, the sugary extract is placed in a fermentation tank and cooled down to 25~40° C., *Bacillus coagulans*, *Acetobacter aceti* and lactic acid bacteria are added into the fermentation tank to continuously perform primary fermentation to produce primary fermented material until the Brix of the primary fermented material is in a range of 2.7 to 5.5, the pH value of the primary fermented material is in a range of 2.7 to 4.6, and the total acidity of the primary fermented material is in a range of 0.03 g/100 g to 0.10 g/100 g.

In a step 150, the primary fermented material is filtered. The filtered primary fermented material is placed into a mixing tank, and yeast is added into the mixing tank to mix with the primary fermented material. The mixed primary fermented material is filtered and the filtered primary fermented material is filled into a container for secondary fermentation to produce secondary fermented material until the Brix of the secondary fermented material is in a range of 2.4 to 5.5, the pH value of the secondary fermented material is in a range of 2.5 to 4.6, the total acidity of the secondary fermented material is in a range of 0.06 g/100 g to 0.16 g/100 g, an alcohol content of the secondary fermented material is lower than 0.5%, and the volume of carbon dioxide of the secondary fermented material is equal to or greater than 2.0. In a step 160, after the secondary fermentation is completed, heat treatment is performed on the secondary fermented material in the container, to deactivate the yeast, the lactic acid bacteria and the *Acetobacter aceti* in the container and stop fermentation reaction, and then the secondary fermented material is cooled to ambient temperature to prepare kombucha fermented beverage.

Through aforementioned steps, the two-stage inoculation and two-stage fermentation process are performed by inoculation time difference and staged fermentation. In the first stage, *Bacillus coagulans*, *Acetobacter aceti* and lactic acid bacteria are inoculated into the fermentation tank, which contains sugary extract to perform primary fermentation to produce the primary fermented material. In the second stage, yeast is added into the primary fermented material in the container to perform secondary fermentation and produce the secondary fermented material, and then the secondary fermented material is pasteurized to deactivate the yeast, the lactic acid bacteria and the *Acetobacter aceti* in the container and stop fermentation reaction. Finally, the secondary fermented material is cooled to ambient temperature to prepare the kombucha fermented beverage preserving active *Bacillus coagulans* at ambient temperature.

In actual implementation, in the step 110, the tea leaves may include but are not limited to black tea, green tea, dark tea and oolong tea; the tea leaves can be placed in a filter bag, and the filter bag is then added in the reverse osmosis water to produce the mixture. In an embodiment, the tea leaves may include but not limited to organic raw material, such as organic black tea, or organic green tea. In addition, the specification of the filter bag can be 300 mesh or other similar specification. In the step 120, the time interval of stirring the mixture may include but not limited to 5~15 minutes, and every stirring operation may include but not limited to continue 30~90 seconds. In the step 130, the sugary additive component may include but not limited to granulated sugar (such as organic sugar) and fructooligosaccharides (FOS). After the sugary additive component is added into the extract, the extract is stirred at a temperature of 90~100° C. for 5~15 minutes in a double kettle to produce the sugary extract. When the primary fermentation is performed in the fermentation tank in the step 140, the temperature is controlled in a range of 25~40° C. to continuously perform fermentation for 48~96 hours, to make the primary fermented material have the Brix of 2.7~5.5, the pH value of 2.7~4.6 and the total acidity of 0.03~0.10 g/100 g. It should be noted that, when the Brix, the pH value and the total acidity do not satisfy above-mentioned conditions, the primary fermentation is continuously performed until the above-mentioned conditions are satisfied; in other words, the fermentation time of the present invention is not limited to 48~96 hours; when the above-mentioned conditions are satisfied before the continuous fermentation time reaches the range of 48 hours to 96 hours, the primary fermentation is stopped. In the step 150, the mixed primary fermented material is filtered and filled to the container to perform the secondary fermentation, and the temperature is controlled in a range of 25~40° C., and the secondary fermentation is continuously performed for 12~48 hours; similarly, the above-mentioned temperature and fermentation time is not limited in the present invention, as long as the secondary fermented material has the Brix of 2.4~5.5, the pH value of 2.5~4.6, the total acidity of 0.06~0.16 g/100 g, the content of alcohol lower than 0.5% and the volume of carbon dioxide equal to or greater than 2.0, the secondary fermentation in the container can be stopped, and the manner of stopping the secondary fermentation can be implemented by performing the pasteurization on the secondary fermented material in the container at a temperature of 60~90° C. for 10~30 minutes. In this way, the kombucha fermented beverage prepared in the step 160 will contain metabolites, which is produced by the action of microorganisms in the fermentation process, so that the kombucha fermented beverage contains 4000~7000 Unit/mL of SOD-like enzymes, and the ratio of bubbles to alcohol generated during the secondary fermentation can be 1:1. Therefore, the kombucha fermented beverage has antioxidant properties and natural bubbles for improving taste.

Figure 2A:
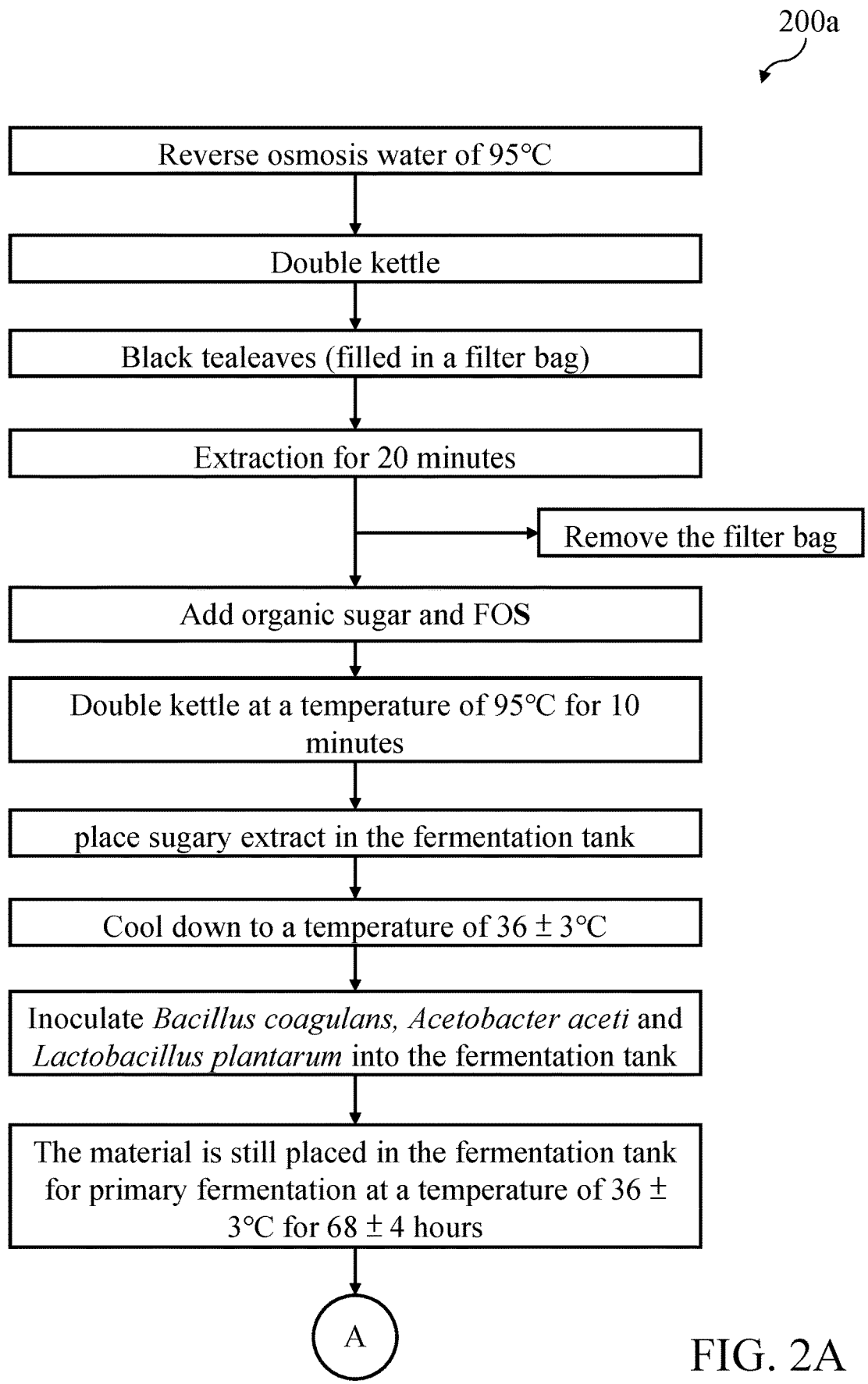
FIGS. 2A and 2B are flowcharts of embodiments of kombucha fermented beverage preserving active *Bacillus coagulans* at ambient temperature, according to the present invention.
Figure 2B:
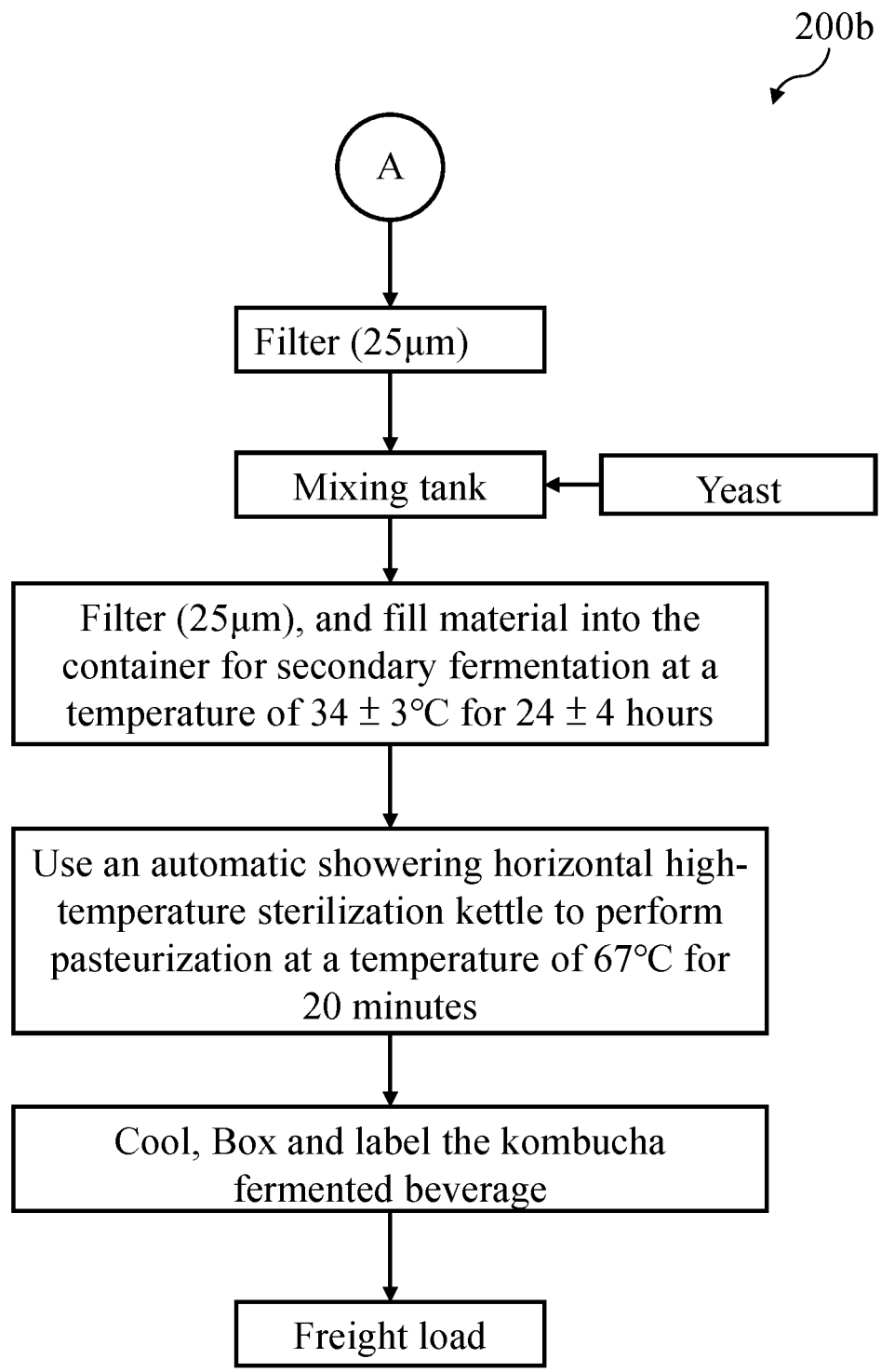

The embodiment of the present invention will be described in the following paragraphs with reference to FIGS. 2A and 2B. As shown in FIGS. 2A and 2B, which are flowcharts of embodiments of kombucha fermented beverage preserving active *Bacillus coagulans* at ambient temperature, according to the present invention. In actual implementation, the overall process can be divided into the first stage 200a and the second stage 200b. The first stage 200a is ended by completion of the primary fermentation, and the second stage 200b mainly performs the secondary fermentation. First, as shown in FIG. 2A, in the first stage 200a, the reverse osmosis water at 95° C. is added into a double kettle, and the filter bag filled with black tea leaves are added into the reverse osmosis water, and the water in the double kettle is continuously stirred at every preset time interval, for example, the stirring operation of the extraction is performed at the beginning, 5th minute, 10th minute and 15th minute, each stirring operation is kept for 60 second, and the extraction can last for 20 minutes so as to produce the extract. When the Brix of the extract is 0.4±0.1, the pH value of the extract is 5.0±0.2, and the color of the extract matches the preset tea color, it indicates that critical criteria are satisfied, and next production flow can be performed; otherwise, the critical criteria are not satisfied and the extraction must be performed continuously until the critical criteria are satisfied. In other words, the criteria of determining whether the extraction is completed include Brix being 0.4±0.1, pH value being 5.0±0.2, and color matching the preset tea color. When all of the above-mentioned criteria are satisfied, it indicates that the extraction is completed; otherwise, the extraction time is extended until the all of the above-mentioned criteria are satisfied. After the critical criteria are satisfied, the filter bag is taken out of the double kettle, and the organic sugar and the fructooligosaccharides (FOS) are added into the double kettle, and the material in the double kettle is stirred at a temperature of 95° C. for 10 minutes to produce the sugary extract, and the critical criteria include Brix being 4.6±0.2 and pH value being 5.0±0.2. When the sugary extract satisfies the critical criteria, the sugary extract is placed in the fermentation tank and cooled down to 36±3° C. Next, inoculating *Bacillus coagulans, Acetobacter aceti* and lactic acid bacteria (that is, *Lactobacillus plantarum*) into the fermentation tank until the Brix is 4.6±0.2 and the pH value is 4.3±0.3 (that is, the critical criteria after bacteria powder is added to adjust acidity). Next, the material is still placed in the fermentation tank to continuously perform primary fermentation, for example, the material can be still placed at a temperature of 36±3° C. for 68±4 hours to produce the primary fermented material, and the critical criteria of the primary fermented material are the Brix of 4.0±0.2, the pH value of 4.0±0.2 and the total acidity of 0.06±0.02 g/100 g. In this case, when the primary fermented material satisfies the critical criteria, the primary fermented material is referred as semi-finished product of the kombucha fermented beverage. Next, as shown in FIG. 2B, in the process of the second stage 200b, the semi-finished product (that is, the primary fermented material) is filtered with filteration accuracy of 25 μm, and the filtered primary fermented material is placed in the mixing tank, the yeast (such as *Saccharomyces boulardii*) is added into the mixing tank to mix with the primary fermented material, and the mixed primary fermented material is filtered with filteration accuracy of 25 μm, and filled into the container to continuously perform fermentation at a temperature of 34±3° C. for 24±4 hours so as to undergo the secondary fermentation to produce the secondary fermented material. As long as the secondary fermented material has the Brix of 3.8±0.4, the pH value of 3.8±0.2, the total acidity of 0.10±0.02 g/100 g, the content of alcohol lower than 0.5% and the volume of carbon dioxide equal to or greater than 2.0, it indicates that fermentation in the container (or called in-bottle fermentation) satisfies the critical criteria and the secondary fermentation is completed. Next, in order to prevent alcohol and carbon dioxide from being generated in continuous fermentation to cause the excessive pressure in the container and the flavor degradation, the pasteurization is performed at a temperature of 60~90° C. (such as 67° C.) for 20 minutes continuously in an automatic showering horizontal high-temperature sterilization kettle to deactivate yeast, lactic acid bacteria, *Acetobacter aceti* to stop fermentation reaction. The container and the secondary fermented material are completely performed with the pasteurization, and then cooled to the ambient temperature to prepare the kombucha fermented beverage preserving active *Bacillus coagulans* at ambient temperature. Next, the kombucha fermented beverage preserving active *Bacillus coagulans* at ambient temperature is boxed and labelled for a freight load. It is to further explain that, in the conditions of determining the fermentation termination in the second stage 200b, the content of alcohol can be confirmed by analyzing the volume of carbon dioxide (GV) because carbon dioxide and alcohol produced by reaction of yeast are positively correlated with each other, the alcohol content in the kombucha fermented beverage can be estimated based on the volume of carbon dioxide (GV). Compared with the general detection of alcohol content taking more time and the test result is unable to respond immediately, the volume of carbon dioxide is able to quickly analyze whether the content of alcohol is lower than 0.5%.

It should be noted that, although the above-mentioned embodiment takes different fermentation times and temperatures as examples, the present invention is not limited to these examples. In fact, the fermentation time and temperature are determined according to the critical criteria, that is, any fermentation time and temperature satisfying the critical criteria are not deviated from the scope of application of the present invention. In addition, the above-mentioned first stage 200a and second stage 200b apply the special preparation with two-stage inoculation and two-stage fermentation process, using a time difference of inoculation and staged fermentation can make the kombucha fermented beverage have a naturally fabulous sparkling taste and have the alcohol content less than 0.5%. The completion condition of the first stage 200a is that the primary fermented material has the Brix of 2.7~5.5, the pH of 2.7~4.6 and the total acidity of 0.03~0.10 g/100 g, and all of the three criteria must be satisfied at the same time to complete the fermentation in the first stage 200a; the completion condition of the second stage 200b is that the secondary fermented material has the Brix of 2.4~5.5, the pH value of 2.5~4.6, the total acidity of 0.06~0.16 g/100 g, a content of alcohol less than 0.5% and the volume of carbon dioxide equal to or greater than 2.0, and the fermentation in the second stage 200b is considered to be completed when all of the criteria are satisfied. In any one of the first stage 200a and second stage 200b, when one of the above-mentioned values is lower than the above criteria, the fermentation time must be extended until the detection values satisfy the criteria. In addition, since specific bacteria species (such as *Bacillus coagulans, Acetobacter aceti, Lactobacillus plantarum* and *Saccharomyces boulardii*) are used in fermentation, the source and the identity of fermentation microorganism can be confirmed so as to ensure the hygiene, safety and taste consistency of the kombucha fermented beverage.

According to above-mentioned contents, the difference between the present invention and the conventional technology is that, the two-stage inoculation and two-stage fermentation process are performed by inoculation time difference and staged fermentation in the present invention. In the first stage, *Bacillus coagulans, Acetobacter aceti* and lactic acid bacteria are inoculated into the fermentation tank, which contains sugary extract to perform primary fermentation to produce the primary fermented material. In the second stage, yeast is added into the primary fermented material to perform secondary fermentation to produce the secondary fermented material in the container, and then the secondary fermented material is pasteurized to deactivate yeast, lactic acid bacteria and *Acetobacter aceti* in the container and stop fermentation reaction. Finally, the secondary fermented material is cooled to ambient temperature to prepare the kombucha fermented beverage preserving active *Bacillus coagulans* at ambient temperature. Therefore, the above-mentioned technical solution of the present invention is able to solve the convention problem, there by achieve the technical effect of improving the storage convenience of the kombucha fermented beverage and preventing the concentration of alcohol from exceeding a standard.

The present invention disclosed herein has been described by means of specific embodiments. However, numerous modifications, variations and enhancements can be made thereto by those skilled in the art without departing from the spirit and scope of the disclosure set forth in the claims. Therefore, the protection scope of the present invention shall be determined by the appended claims.

What is claimed is:

1. A preparation method of fermented kombucha beverage preserving active *Bacillus coagulans* at ambient temperature, comprising:
preparing reverse osmosis water at 70~100° C., and adding tea leaves to the reverse osmosis water to produce a mixture;

continuously stirring the mixture at every time interval to produce an extract until the Brix of the extract is in a range of 0.2 to 0.7, the pH value of the extract is in a range of 3.4 to 6.8 and the color of the extract matches a preset tea color;

adding a sugary additive component to the extract, and continuously stirring the sugary additive component and the extract at a temperature of 70~100° C. to produce a sugary extract until the Brix of the sugary extract is in a range of 3.1 to 6.2 and the pH value of the sugary extract is in a range of 3.4 to 6.8;

placing the sugary extract in a fermentation tank and cooling the sugary extract down to 25~40° C., adding *Bacillus coagulans, Acetobacter aceti* and lactic acid bacteria into the fermentation tank to continuously perform primary fermentation on the sugary extract to produce a primary fermented material until the Brix of the primary fermented material is in a range of 2.7 to 5.5, the pH value of the primary fermented material is in a range of 2.7 to 4.6, and the total acidity of the primary fermented material is in a range of 0.03 g/100 g to 0.10 g/100 g;

filtering the primary fermented material, placing the filtered primary fermented material into a mixing tank, adding yeast into the mixing tank to mix with the primary fermented material, and filtering the mixed primary fermented material and filling the filtered primary fermented material into a container for secondary fermentation with the yeast to produce a secondary fermented material until the Brix of the secondary fermented material is in a range of 2.4 to 5.5, the pH value of the secondary fermented material is in a range of 2.5 to 4.6, the total acidity of the secondary fermented material is in a range of 0.06 g/100 g to 0.16 g/100 g, the alcohol content of the secondary fermented material is lower than 0.5%, and the volume of carbon dioxide of the secondary fermented material is equal to or greater than 2.0; and after the secondary fermentation is completed, the secondary fermented material in the container is subjected to heat treatment to deactivate the yeast, the lactic acid bacteria, and the *Acetobacter aceti* in the container and stop fermentation reaction, and then cooling the secondary fermented material to ambient temperature to prepare fermented kombucha beverage preserving active *Bacillus coagulans* at ambient temperature.

2. The preparation method of fermented kombucha beverage preserving active *Bacillus coagulans* at ambient temperature according to claim 1, wherein the tea leaves comprise at least one of black tea, green tea, dark tea and oolong tea, and the tea leaves are placed in a filter bag, and the filter bag is placed into the reverse osmosis water to produce the mixture.

3. The preparation method of fermented kombucha beverage preserving active *Bacillus coagulans* at ambient temperature according to claim 1, wherein the time interval is in a range of 5~15 minutes, and every stirring operation continues 30~90 seconds.

4. The preparation method of fermented kombucha beverage preserving active *Bacillus coagulans* at ambient temperature according to claim 1, wherein the sugary additive component comprises granulated sugar and fructooligosaccharides (FOS), and after the sugary additive component is added into the extract, the extract is stirred at a temperature of 90~100° C. for 5~15 minutes in a double kettle to produce the sugary extract.

5. The preparation method of fermented kombucha beverage preserving active *Bacillus coagulans* at ambient temperature according to claim 1, wherein the primary fermentation in the fermentation tank is continuously performed at a temperature of 25~40° C. for 48~96 hours.

6. The preparation method of fermented kombucha beverage preserving active *Bacillus coagulans* at ambient temperature according to claim 1, wherein the secondary fermentation in the container is continuously performed at a temperature of 25~40° C. for 12~48 hours.

7. The preparation method of fermented kombucha beverage preserving active *Bacillus coagulans* at ambient temperature according to claim 1, wherein the lactic acid bacteria is *Lactobacillus plantarum*.

8. The preparation method of fermented kombucha beverage preserving active *Bacillus coagulans* at ambient temperature according to claim 1, wherein the yeast is *Saccharomyces boulardii*.

9. The preparation method of fermented kombucha beverage preserving active *Bacillus coagulans* at ambient temperature according to claim 1, wherein a pasteurization is continuously performed on the secondary fermented material in the container at a temperature of 60~90° C. for 10~30 minutes.

10. A fermented kombucha beverage prepared by the preparation method of claim 1.

* * * * *